United States Patent [19]

Throne

[11] Patent Number: 5,364,657
[45] Date of Patent: Nov. 15, 1994

[54] METHOD OF DEPOSITING AND FUSING POLYMER PARTICLES ONTO MOISTENED CONTINUOUS FILAMENTS

[75] Inventor: James L. Throne, Akron, Ohio

[73] Assignee: The University of Akron, Akron, Ohio

[21] Appl. No.: 505,519

[22] Filed: Apr. 6, 1990

[51] Int. Cl.⁵ .......................... B05D 1/24; B05D 3/02
[52] U.S. Cl. ................................ 427/185; 427/195; 427/407.2
[58] Field of Search ............... 427/177, 178, 174, 185, 427/195, 407.2

[56] References Cited

U.S. PATENT DOCUMENTS

| | | | |
|---|---|---|---|
| 3,862,287 | 1/1975 | Davis | 264/131 |
| 3,919,437 | 11/1975 | Brown et al. | 427/185 |
| 4,626,306 | 12/1986 | Chabrier et al. | 427/174 |
| 4,764,427 | 8/1988 | Hara et al. | 427/407.1 |
| 4,839,199 | 6/1989 | de Jager | 427/185 |
| 5,094,883 | 3/1992 | Muzzy et al. | 427/135 |

OTHER PUBLICATIONS

Throne, J. L., et al, "Electrostatic Dry Powder Prepreggin of Carbon Fiber", 35th International Sampe Symposium, Apr. 2–5, 1990, pp. 2086–2101.

Primary Examiner—Peter A. Nelson
Attorney, Agent, or Firm—Oldham, Oldham & Wilson Co.

[57] ABSTRACT

Process for making a tow pre-preg comprising long continuous fibers coated with a thermoplastic polymer. A continuously moving spread tow of long continuous fibers, preferably carbon or glass, is humidified in an atmosphere of essentially 100% relative humidity and coated with particles of a thermoplastic polymer. A polymer particle-laden air stream contacts the moistened continuously moving tow, depositing polymer particles on the fibers. The fiber diameter is about 5–50 microns and the mean particle diameter is about 0.1–40 microns. The fibers with thermoplastic particles clinging thereto are continuously heated to a temperature sufficient to cause fusion of the thermoplastic polymer. This results in long continuous fibers coated with the thermoplastic polymer. The resulting tow-preg, or tow of coated fibers, is useful in the preparation of structural composites in which the fibers service reinforcing fibers. The thermoplastic coating polymer is a high performance polymer, such as polyether-ether ketone (PEEK), where high performance and the structural composite is desired. Polymer coating weights may vary from about 20% to about 90% of the total tow-preg weight.

18 Claims, 2 Drawing Sheets

METHOD OF DEPOSITING AND FUSING POLYMER PARTICLES ONTO MOISTENED CONTINUOUS FILAMENTS

GOVERNMENT RIGHTS

This invention was made with Government support under Contract Nos. NAG-1-779 and NAG-1-343. The Government has certain rights in this invention.

TECHNICAL FIELD

This invention relates to methods or processes for coating of continuous fibers. More particularly, this invention relates to processes for producing coated fibers or filaments which are useful in making high-performance composites in which dry polymer particles are deposited on moistened fibers and then fused.

BACKGROUND OF THE INVENTION

Fiber-reinforced resin composites have gained an increasing market share for high performance parts used in various industries, as for example automotive and aircraft components, tank parts and missile cases. In the composite industry, continuous carbon and glass fibers are impregnated with polymeric resins, then wound or layered against rigid mold surfaces and cured into structural parts.

Two classes of resins are used in composites. A thermosetting resin reacts in the presence of heat or a catalyst to produce a 3-dimensional structure that cannot be reshaped. Epoxies and certain polyimides are examples of thermosetting resins used in composite technology. A thermoplastic resin retains its two-dimensional structure in the presence of heat and pressure. As a result, thermoplastic resins can be softened or melted many times, thus allowing for reshaping. Polyether-etherketone (PEEK), ultra high molecular weight polyethylene (UHMWPE) and polybenzimidazole (PBI) are examples of high performance thermoplastics used in forming composites. In general, the art of forming high performance thermosetting resin composites is more advanced than the art of forming high performance thermoplastic composites.

A problem encountered in the preparation of fiber reinforced thermoplastic composites is that it is difficult to obtain good wetting of the reinforcing fibers or filaments, and consequently it is difficult to obtain composites in which air bubbles are absent at the interfaces between resin and reinforcing fiber. As a consequence, it is desirable to form pre-pregs of fiber-reinforced resins in which the fibers constitute a relatively high percentage of the weight of the prepreg and then to incorporate these pre-pregs into the resinous composite.

Various methods of coating fibers with the desired coating polymer are known. Basically, these are as follows:
1. Solution coating, i.e. dissolving the polymer in a solvent, coating the resulting solution onto a fiber tow, evaporating away the solvent, leaving the polymer as a coating on the fiber surface.
2. Suspension or emulsion coating, i.e. suspending or emulsifying a powder polymer in a non-solvent, coating the fiber tow with the resulting liquid suspension or emulsion, then evaporating the non-solvent carrier, leaving the polymer powder in intimate contact with the fibers. An additional thermal process step, to fuse the powder on to the fiber surface, is usually required.
3. Melt impregnation of a fiber tow with molten polymer.
4. Spinning processes, i.e., spinning a fiber of the polymer, weaving or commingling these fibers with the tow, then heating the fiber structure to melt the polymer fibers on to the adjacent reinforcing fibers.

Each one of these processes has one or more technical limitations. Solvents can be toxic or noxious, and in any case, are very difficult to remove from most high performance polymers. Solvents trapped in the final composite product can result in porosity and weak areas in the structure.

High polymer viscosity inhibits resin impregnation of the reinforcing fiber bundle with molten polymer.

Suspensions and emulsions usually require the addition of emulsifiers or suspending agents, which remain in the finished composite and which can adversely affect mechanical performance.

Commingling requires production of a polymeric fiber from the matrix material. This can be difficult to do and can be quite expensive.

Another coating process is electrostatic coating. Basically, charged particles of a desired coating agent are applied to the surface of a substrate which is either oppositely charged or grounded. While electrostatic coating techniques have been used to coat flat surfaces, e.g. sheets, and single rods or wires, only very recently (in 1989) has the use of dry powder coating techniques for coating of reinforcing fiber tows been reported in the literature. Such process, is disclosed, for example, by Muzzy, 34th International SAMPE symposium, May 8-11, 1989, pages 1940-1951. This reference describes preparation of thermoplastic tow pregs by electrostatic deposition of charge fluidized thermoplastic polymer particles from a fluidized bed onto a spread continuous grounded carbon fiber tow. The disadvantage of the Muzzy process, is that it works best with comparatively coarse polymer particles, e.g., those having average sizes of about 80 microns or larger, and does not work particularly well with finer particles.

Other electrostatic coating processes, such as the process shown and described in the U.S. Pat. No. 408,409 to Christ et al, are also known.

U.S. Pat. No. 3,873,389 to Daniels describes a process and apparatus for numerically spreading thin carbon filaments from a tow bundle to form a sheet or tape in the individual filaments are parallel. This is achieved by passing the tow continuously through a pair of slot venturi spreaders with air flowing concurrently with the tow in the first and counter currently to the tow in the second. The spread tow may then be continuously passed through a bath of impregnating material, which is usually a plastic resin of the epoxy, phenolic or polyimide type.

DISCLOSURE OF THE INVENTION

This invention provides a process for coating a fiber tow with a thermoplastic polymer, which process comprises:
(a) spreading a fiber tow of continuously moving, long continuous fibers;
(b) moistening the spread fiber tow;
(c) depositing dry particles of a thermoplastic polymer onto a moistened tow of long continuous fibers, said particles having a mean particle size in the range of about 0.1 to about 40 microns, and said fibers being of essentially uniform diameter in the range of about 5 to about 50 microns;

(d) heating the particles to a temperature sufficiently high to fuse said particles of thermoplastic polymer and thereby form a coating of said thermoplastic polymer on said fibers, and (e) winding up the coated fibers.

BEST MODE FOR CARRYING OUT THE INVENTION

Figure 1:
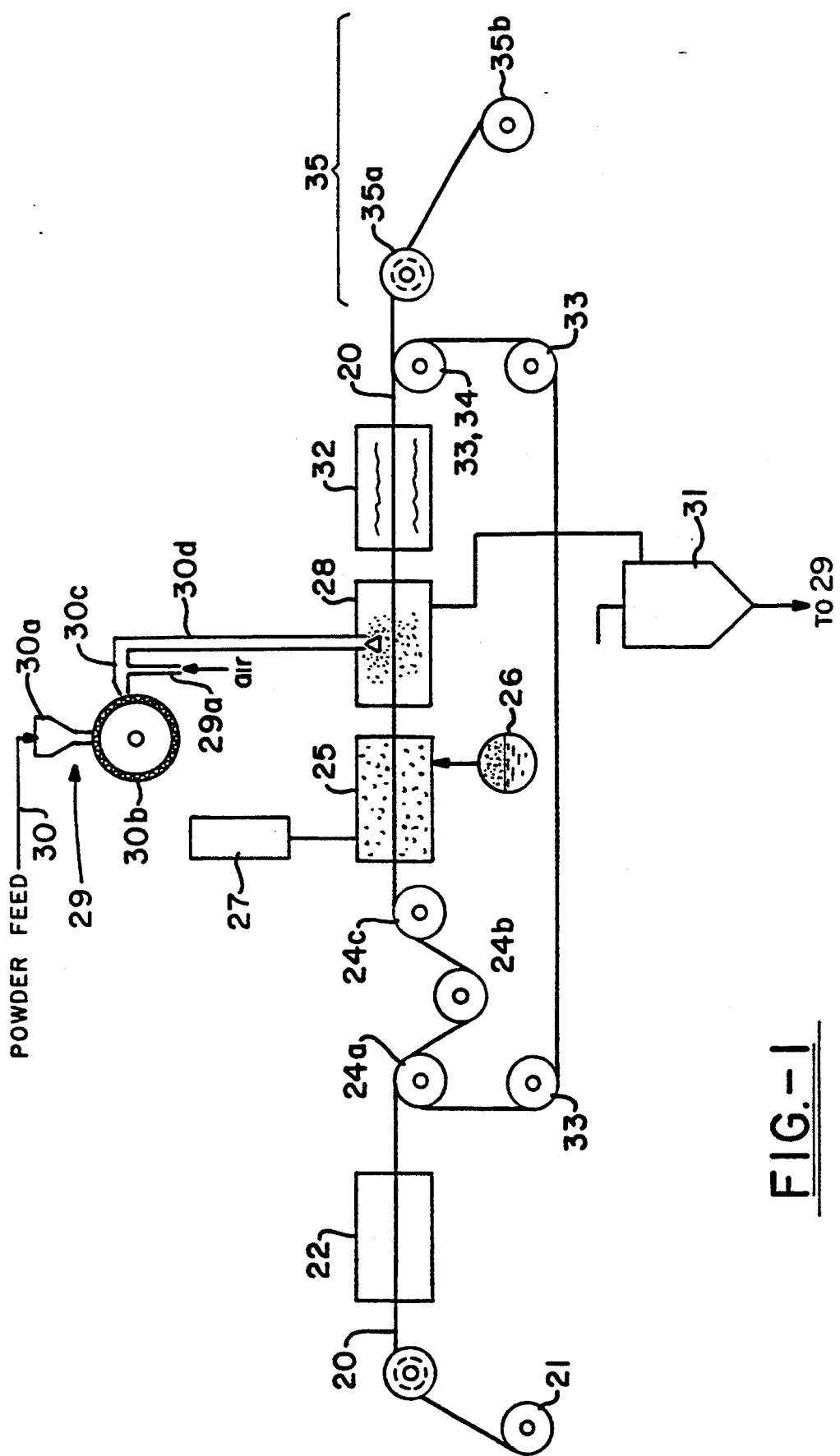
FIG. 1 is a schematic front elevational view of a preferred processing line used in the practice of this invention.

This invention will now be described in detail with respect to the best mode and preferred embodiment thereof, as particularly shown in the accompanying drawings.

The fiber or filament which is treated according to this invention in the form of a tow, typically containing from 3,000 to 12,000 (3K to 12K) fibers of essentially uniform diameter, wound around a spool. The mean fiber diameter may be in the range of about 5 to about 50 microns, preferably from 5 to about 20 microns. The fibers are long continuous fibers. The phrase "of essentially uniform diameter" denotes that all or nearly all the fibers have a fiber diameter within ±20 percent of the mean fiber diameter, and usually within ±10 percent of the mean fiber diameter.

Any fiber which is suitable for plastics reinforcement may be used. Suitable fibers include glass, carbon, aromatic polyamide (e.g. aramid, which is sold under the trademark "Kevlar"), aromatic polyimide, ceramic and metal. Preferred fibers for the purpose of this invention are glass and carbon. Typically, fiber diameters are 5 to 50 microns.

The thermoplastic coating material is preferably a high performance thermoplastic resin such as polyether-ether ketone (PEEK), ultra-high molecular weight polyethylene (UHMWPE), thermoplastic polyimide (TPI) or polybenzimidazole (PBI). Other high performance thermoplastics are known and may be used as coating materials. Plastic coating material must be one which does not deleteriously affect the properties of the fiber-reinforced composite into which the coated fibers of the present invention are incorporated. Thus, when the desired end product composite must have good high temperature performance, a high performance thermoplastic must be used as a coating material. While the term, "high performance thermoplastic" has no precise definition, it is widely used and the polymer which the term embraces are generally understood and agreed upon. Most high performance polymers have melting points or glass transition temperatures in excess of 200° C. An exception is UHMWPE, which has a melting point of 130° C. and is considered a high performance polymer. However, UHMWPE has a very high abrasion resistance and impact toughness. More common thermoplastic polymers, which are not high performance polymers, may be used for coating where their presence in the desired end use reinforced composite is acceptable.

The coating polymer of this invention is deposited in particle form on the surfaces of the fibers forming the tow. The coating polymer particles are generally in the range of about 0.1 to about 40 microns. These values represent mean particle diameters. Preferred mean particle diameter is in the range of about 5 to about 20 microns. Generally the mean particle diameter will be no more than twice the mean fiber diameters; the ratio of mean particle diameter to mean fiber diameter is preferably from about 0.5 to about 1.5. Generally there is a particle size distribution among the coating particles. It is preferred that the largest coating particles be no more than about 5 times the mean fiber diameter.

The fibers of the tow are pre-moistened to a moisture content of about 1% to about 25%, preferably about 5% to about 10%, based on fiber weight, by continuously passing a fiber tow through a humidifying zone containing water vapor. Too much moisture causes the fibers to stick to each other, which impairs subsequent powder application. The pressure in this humidifying zone is preferably atmospheric pressure, and the relative humidity is essentially 100%. The saturated water vapor atmosphere may be generated by conventional means. It is believed that the water which clings to the fibers is in droplet form, although it is possible that the water forms a thin coating or film surrounding the fibers. Instead of water, one may use another liquid, say a lower alkyl alcohol such as methanol or ethanol which has sufficient surface tension to cling to the fibers, which preferably is a non-solvent for the fibers and which has a boiling point low enough to evaporate during the subsequent fusion step. However, water is preferred because of its non-flammability and low cost. The fibers as they enter the humidifying zone must be at a temperature which is lower than the dew point of the atmosphere of the humidifying zone, so that the condensation will take place.

Dry particles of the coating polymer are suspended in a moving air stream which is moving at a velocity above the fluidizing velocity of the particles. This air stream is contacted with the continuously moving tow of moistened fibers in a closed container which is commonly called a dust box. Other gases, for example nitrogen, may be substituted for air, although for cost reasons air is preferred. More broadly, any technique which will cause the dry particles to separate from each other prior to application to the moistened fiber tow can be used.

The process of this invention will be described with particular reference to the drawings.

Figure 2:
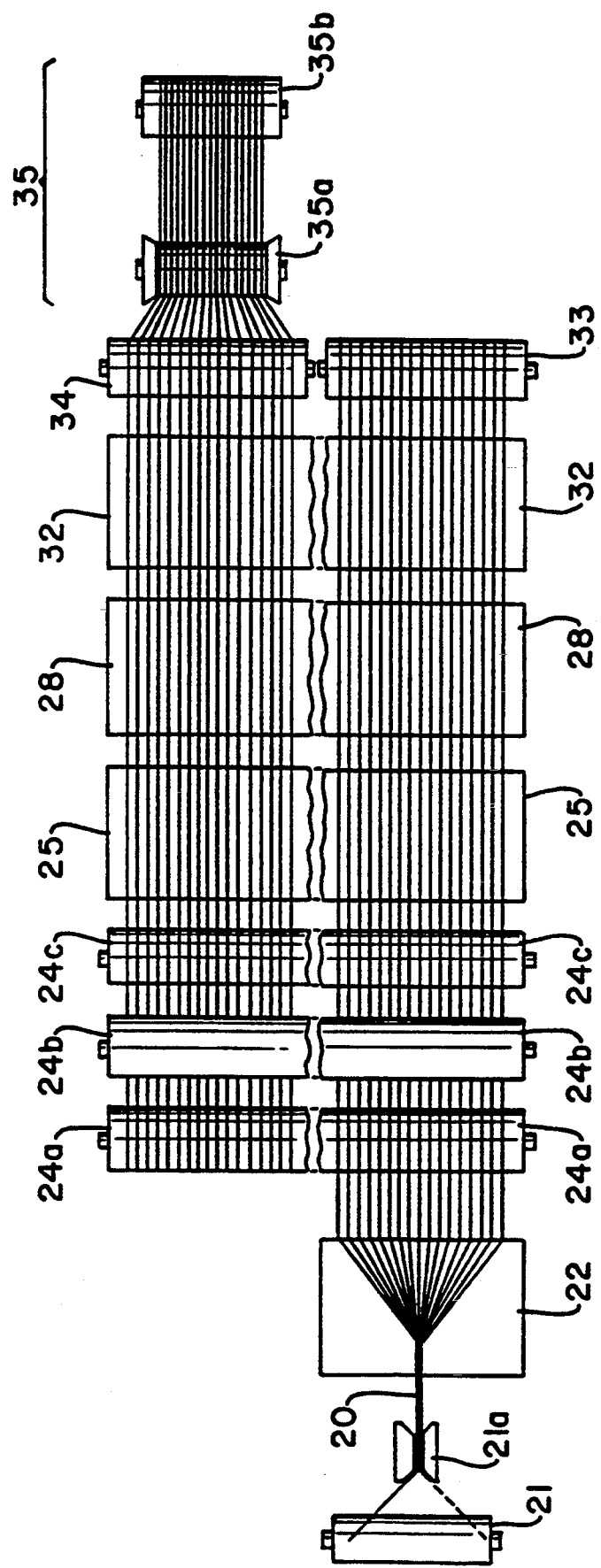
FIG. 2 is a schematic plan view of the processing line shown in FIG. 1.

Referring now to FIGS. 1 and 2, a fiber bundle or tow 20, typically consisting of 3,000 to 12,000 (3K to 12K) fibers having a mean fiber diameter of about 5 to about 50 microns, is unwound from take-off spool 21 at a constant speed, and centered by a centering pulley (not shown). This centering pulley is V-shaped to allow for tow feed from the edges of the spool. Frictional drag of the tow over the pulley surface causes the pulley to rotate. The pulley shaft is supported by air bearings. The tow then passes continuously through a pneumatic fiber spreader 22, where the tow is pneumatically spread laterally to a width suitable for subsequent deposition of thermoplastic coating particles thereon. The fiber spreader may be as described in C. Kim and R. A. Gray, "Development of Fiber Spreading Technique for Metal Matrix Composites", NRL Memorandum Report 5831, 30 Dec. 1986, *Naval Research Laboratories*, Washington, D.C. Fiber spreader 22 operates at substantially atmospheric pressure, which as used herein, includes slight superatmospheric and slight subatmospheric pressures. Preferably spreader 22 is operated at a very slight subatmospheric pressure, of about 5 inches of water. Air streams enter the fiber entrance and fibre exit ends, respectively, of spreader 22. Spreader 22 includes aligned spreader elements (not shown) of rectangular cross section and slot-like dimensions (i.e. much wider than high) through which the fiber tow passes. Adjustable flow restrictors associated with these elements (typically at the tow entrance end and at the tow exit end) give a venturi effect. Laminar air flow through these elements, concurrent in the first portion and countercurrent in the second, causes the tow to spread laterally. Air is discharged from spreader 22 through a common air outlet port (not shown). A pump or fan (not shown) is provided in order to exhaust air from subatmospheric pressure in the spreader 22 to the atmosphere. It is possible to omit the concurrent air stream, and thereby rely on countercurrent air flow alone to spread the tow. Good results are obtained in either case. It is also possible to omit the flow restrictor associated with the spreader element and instead rely on pressure control in the air outlet port in order to obtain desired operating conditions.

Another suitable fiber tow spreader, which operates on the same general principle, is that shown in U.S. Pat. No. 3,873,389 to Daniels cited supra.

The spread tow 20 is then passed over a series of centering rolls, i.e. over a convexly curved (i.e. barrel shaped) polyethylene roll 24a, then under a tension type flat (or cylindrical) polyethylene roll 24b, then over a third centering roll 24c. Rolls 24a, 24b and 24c are supported on air bearings.

The degree of spread of tow 20 at the time of particle deposition thereon is not critical, but must be sufficient so that substantially all fiber surfaces are exposed and therefore available for particle deposition. In the illustrated embodiment, the average number of rows of fibers in the thickness direction (which is perpendicular to both the fiber axes and the width direction) is approximately 2.5, based on a 12K tow, a fiber diameter of 5 to 20 microns, and a tow spread width of correspondingly 25 to 100 mm.

The spread tow 20 is continuously passed into a humidifying zone or humidifier 25. The tow 20 as it enters humidifier 25 must be at a temperature lower than the dew point of the atmosphere in humidifier 25. This humidifier is an enclosed hollow box-like structure having openings at either end for continuous entrance and exit of the fiber tow. A saturated steam atmosphere is maintained in humidifier 25 by steam generated in boiler 26. Steam leaving humidifier 25 is condensed in condenser 27, and the condensate may be reused. The pressure in humidifier 25 is typically atmospheric pressure and the relative humidity in humidifier 25 is essentially 100%. Water condenses onto the fiber surfaces and clings thereto.

The continuously moving tow then enters an enclosed container or box, commonly called a dust box 28, in which powdered polymer particles of the desired coating polymer are deposited on the surfaces of the fibers. Dust box 28 has slotted openings at either end for entrance and exit of the continuously moving tow. An air stream laden with powdered polymer particles flows transversely to the longitudinal direction of the tow fibers (i.e., in the thickness direction of the tow). The velocity of the air stream is in excess of the fluidizing velocity of the polymer particles therein. The dust box is operated at a slight negative pressure to minimize dusting problems.

The particle-laden air stream is formed in a powder aspirator 29. A preferred powder aspirator (or dry particle dispensing system) is that shown in NASA Conference Publication 2393, "Wind Tunnel Seeding Systems for Laser Velocimeters" proceedings of a work shop held at NASA Langley Research Center, Hampton, Va., Mar. 19-20, 1985, compiled by W. W. Hunter Jr. and C. E. Nichols Jr., page 100. This apparatus is frequently referred to as an NBS (for National Bureau of Standards) seeder. This aspirator 29 has a tubular air inlet 29a, a tubular powder feed inlet 30, a vibrating hopper 30a, a rotating toothed wheel 30b and a take-off conduit 30c for powder. The air stream flowing through air inlet 29a aspirates the powder from conduit 30c to form a particle-laden air stream which flows through tubular conduit 30d to dust box 28. The polymer particles are dry at the time of aspiration. These polymer particles cling to the moistened fibers of the fiber tow 20 because of surface tension.

Other means for providing a particle-laden air stream may be used.

Polymer particles which do not adhere to fibers are removed from dust box 28, separated from the air stream in a cyclone separator 31, and returned to aspirator 29.

The spread tow, having coating particles adhering to the fibers, continuously passes from the dust box 28 into a heater (e.g., a radiation/convection oven) 32, where the water is evaporated from the fibers and the polymer particles and the fibers are heated to a temperature sufficient to cause the polymer particles to fuse and thereby form thin polymer coatings on the fibers. The heating temperature in this oven must be sufficient to cause fusion of the polymer and is typically just above the melting point or the glass transition temperature, as the case may be, of the coating polymer.

It is not always possible to deposit the desired weight of coating polymer in a single pass. The fiber tow leaving oven 32 is recycled back to the entrance end of humidifier 25. A plurality of spaced return rolls 33 guide the tow on its return path. After the returning tow passes over the last of these rollers 33, it passes over rolls 24a, 24b and 24c. Each pass of the fiber tow may pass over rolls 24a, 24b and 24c) then through humidifier 25, dust box 28 and heater or oven 32 in succession as shown. When more than two passes through humidifier 25, dust box 28 and oven 32 are required, the tow is again recycled back to humidifier 25 via return rollers 33. Each of the return rollers 33 as shown in the drawings may be either a single roller having multiple parallel tows passing thereover, or may be a series of axially aligned rollers, with one pass of the tow 20 passing over each roller. In this manner a fused polymer coating is built up around the fibers incrementally, the thickness increasing with each pass.

It is possible but not preferred to recycle the tow 20 after it passes through dust box 28, rather than after it passes through oven 32. In this case, recycling results in further humidification of the filaments constituting the tow and further deposit of polymer particles thereon until the weight of particles deposited is sufficient to give the desired coating weight. Then the tow with polymer particles adhering thereto passes once through oven 32, where water is evaporated and the polymer melts to form coatings around the individual fibers or filaments.

The multiple pass coating process as previously described can be carried out in a in-line system rather than with the return system shown. The in-line system requires a plurality of humidifiers 25 dust boxes 28 and heaters 32, arranged in a plurality of sequences, each of which includes a humidifier 25, a dust box 28 and a heater 32 in that order.

Finally, after the desired coating weight has been achieved, usually after multiple passes of the fiber tow, the coated fiber tow (or tow preg) exiting oven 32, is passed successively over a second flat polyethylene centering roller 34, supported on air bearings, and then to a take up respooling system 35 which comprises a rotating idler roll 35a having a cylindrical center portion and outwardly flared conical side portions, and a cylindrical take up spool 35b. It will be noted that the tow is narrowed laterally by the idler spool 35a and this narrowed tow 20 is wound up on spool 35b. The wound up or respooled tow is typically about 10 to 20 mm wide although this width is not critical. The fiber tow 20 passes continuously at constant linear speed through the entire system as above described.

Fiber constitutes from about 20 to 90 percent by weight and coating polymer conversely from about 80 to about 10 percent by weight of a coated fiber tow product or tow-preg according to this invention. Preferably, fiber constitutes about 50 to about 70 percent of the total weight of the tow-preg. Conversely polymer preferably constitutes about 30% to 50% by weight of the tow-preg. Most preferably, fiber constitutes about 60-65% and conversely polymer constitutes about 35-40% as the total weight of the tow-preg.

Tow-pregs prepared according to the present invention are nearly as flexible and have nearly as good a hand as the uncoated fibers. This is in contrast to tow-pregs prepared according to methods presently known in the art, which tend to be stiff. At the same time, the coatings in tow-pregs of this invention are continuous and therefore fully compatible with the matrix polymer of the end use composite into which the tow-preg (or pre-preg) herein is incorporated. The reduced stiffness of pre-pregs herein, compared to those of the prior art, greatly facilitates preparation of the end use composites. Tow-pregs prepared according to the present invention are sufficiently flexible to be suitable for weaving applications.

This invention will now be described with reference to the example which follows.

EXAMPLE I

Materials

The materials used herein are as follows:

Carbon fiber—5 kg AS-4, 12K tow (12,000 individual fibers), obtained from Hercules, Inc., Wilmington, Del. This material has a mean fiber diameter of 7 microns.

Coating polymer—LaRC-TPI 1500, which is a thermoplastic polyimide obtained from Mitsui Toatsu Chemicals, Inc. of Japan. The composition of this polymer is more fully described in U.S. Pat. No. 4,543,295. This material as received has a particle size range from about 0.1 to about 8 microns, with a mean particle size of about 5.6 microns. This material has a melting point, as shown by DSC, of 280° C.

Process

A previously spread fiber tow, 50 mm (more or less) in width wound up along with release paper on a spool so that the spread fiber tow and the release paper are inter-leaved, is unwound from the spool and passed through a humidifying zone comprising a home vaporizer located below the tow line and a shroud located just above the tow line. The shroud is formed from a rectangular cardboard box with the bottom surface removed and with a vent opening between the top surface and the adjacent edge surface. This causes water droplets to deposit on the moving fiber tow. The polymer particles are deposited on the moistened filaments from a particle-laden air stream which is formed in an NBS solid particle dry dispensing system, which is illustrated on page 100 of NASA Publication 2393 cited supra. The moistened fibers with polymer particles adhering thereto are then passed into a radiation oven (e.g., a "Thermoline" radiation oven, model 5.6, containing a quartz cylinder 1 foot long and 1 inch in diameter, open on both ends, which is operated at a temperature of 600° F. about 315° C. Heating in the oven causes the polymer particles to melt and to form a thin coating on each of the fibers. Coated fibers are wound up onto a take up roll. Spread coated fiber tow is then unwound from the take-up roll and rewound onto the feed roll. The process is repeated until the desired coating weight is obtained. Residence time in the oven is about 16 seconds in each pass. Humidification time is about 8 seconds per pass. Particle deposition time is about 2 seconds per pass.

A six pass run as described is carried out. The cumulative resin pickup after each pass, given in weight percent of resin, which is parts by weight of resin per 100 parts by weight of carbon fiber, obtained by excising and weighing a small sample of coated fiber, is as shown in Table I below.

TABLE I

| No. of Passes | Resin pickup wt. % |
| --- | --- |
| 1 | 1.8% |
| 2 | 11.2% |
| 3 | 18.9% |
| 4 | 25.9% |
| 5 | 35.9% |
| 6 | 44.2% |

The resin pickup after the sixth and final pass is 44.2% as Table I shows. This is equivalent to 30.7% by weight of resin or polymer, based on total tow-preg weight.

EXAMPLE II

The procedure of example I is repeated except that dry polymer particles are applied by means of a NBS dry dispenser system as shown on page 100 of NASA Conference Publication 2393 cited supra. Similar results are obtained.

EXAMPLE III

The procedure of example I is repeated except that spread fiber tow is moistened and polymer particles are applied in a plurality of passes, but the tow with polymer particles adhering thereto is heated in the oven only once. Some polymer particles drop off after each pass. The weight percentage of combined resin and moisture pickup after each pass (the weight of carbon fiber representing 100%) is as given in Table II below.

TABLE II

| No. of passes | Resin and moisture pickup, wt. % |
|---|---|
| 1 | 8.4 |
| 2 | 7.9 |
| 3 | 9.3 |
| 4 | 32.0 |
| 5 | 40.0 |
| 6 | 42.6 |
| After oven | 31.6 |

The tow preg produced according to this example contains 24% by weight of polymer, balance fiber, based on total tow preg weight.

EXAMPLE IV

This example describes a continuous process for preparing a tow preg, substantially as shown in the drawings.

Materials and equipment used herein are as described in Example I.

The process scheme in this example follows as shown in the drawings.

The carbon fiber tow is continuously unwound at a linear velocity of 0.7 m/min. This fiber tow is spread in the spreader to a tow width of 35–50 mm. The spread tow passes successively over a spread roll and tension roll and then through a humidifier, all as shown as in the drawings. The spread tow then enters a dust box, which is maintained at a temperature of about 25° C. and a pressure of atmospheric or slightly subatmospheric (about 5 inches water column). A particle-laden air stream of dry polymer particles dispersed in air and flowing at a velocity exceeding the fluidizing velocity, is then passed cross-wise through the spread and moistened carbon fiber tow. A particle-laden air stream is formed in an NBS solid particle dry dispensing system as schematically shown in the drawing. The moistened spread fiber tow with polymer particles adhering thereto is then passed into an oven which is operated at a temperature of about 315° C., causing the polymer particles to fuse and to form a tow preg of carbon fibers individually coated with resin or polymer. The coated fibers are returned to the humidifier and again humidified, further coated with polymer particles and again heated to cause fusion. This operation is repeated several times to give a final tow preg containing approximately 35% by weight of coating polymer, balance (65%) carbon fiber.

While this invention has been described in detail with reference to the best mode and preferred embodiment thereof, it is to be understood that the foregoing description is by way of explanation and not limitation, and that the scope of the invention shall be measured by the attached claims.

I claim:

1. A process for coating a fiber tow with a thermoplastic resin polymer which comprises:
    (a) spreading a continuously moving fiber tow of long continuous fibers;
    (b) moistening the spread fiber tow;
    (c) contacting a flowing gas stream containing suspended particles of a thermoplastic polymer with the moistened tow of long continuous fibers, the velocity of said gas stream being above the fluidizing velocity of said particles, said gas stream flowing transversely to the longitudinal direction of said fibers, said particles having a mean particle size in the range of about 0.1 micron to about 40 microns, and said fibers being of essentially uniform diameter in the range of about 5 to about 50 microns;
    (d) heating the particles to a temperature sufficiently high to fuse said particles of thermoplastic polymer and thereby form a coating of said thermoplastic polymer on said fibers; and
    (e) winding up the coated fibers.

2. A process according to claim 1, said process being a non-electrostatic process wherein no electrical charge is applied either to said fibers or to said particles.

3. A process according to claim 1, wherein, step (a) through (d) are repeated until a tow preg containing from about 20–90% by weight of fiber and conversely from about 80 to about 10% by weight of coating polymer is obtained.

4. A process according to claim 1 wherein said flowing gas stream containing suspended particles is formed by aspirating said particles into said flowing gas stream.

5. A process according to claim 4, wherein said fiber tow is spread pneumatically.

6. A process according to claim 1, wherein said tow is moistened with a non-solvent for the fibers.

7. A process according to claim 6, wherein said non-solvent is water.

8. A process according to claim 7, wherein the amount of water adhering to the fibers of said tow is from about 5% to about 25% of fiber weight.

9. A process according to claim 1, wherein said particles are deposited onto said tow in a zone in which the relative humidity is essentially 100%.

10. A process according to claim 1 wherein the mean particle size of said particles is not greater than about 20 microns.

11. A process according to claim 1, wherein the ratio of mean particle diameter to mean fiber diameter is from about 0.5 to about 1.5.

12. A process according to claim 1, wherein said fibers are of essentially uniform diameter.

13. A process according to claim 1, wherein said fibers are carbon fibers.

14. A process according to claim 1, wherein said fibers are glass fibers.

15. A process according to claim 1, wherein said thermoplastic polymer is a high performance thermoplastic polymer having a melting point above about 100° C.

16. A process according to claim 15, wherein said thermoplastic polymer is selected from the group consisting of polyether-ether ketone (PEEK), ultrahigh molecular weight polyethylene (UHMWPE), thermoplastic polyimide (TPI) and polybenzimidazole (PBI).

17. A process according to claim 1, wherein substantially all of the particles are of a diameter not greater than about twice the mean fiber diameter.

18. A process according to claim 1, wherein said fibers constitute about 20% to about 90% of the total coated fiber composition weight.

* * * * *